US 7,365,515 B2

(12) United States Patent
Takano et al.

(10) Patent No.: US 7,365,515 B2
(45) Date of Patent: Apr. 29, 2008

(54) UNIVERSAL BATTERY CHARGER

(75) Inventors: Nobuhiro Takano, Hitachinaka (JP); Kazuhiko Funabashi, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 82 days.

(21) Appl. No.: 10/724,205

(22) Filed: Dec. 1, 2003

(65) Prior Publication Data

US 2004/0108834 A1    Jun. 10, 2004

(30) Foreign Application Priority Data

Nov. 29, 2002    (JP)    ............................ P2002-349243

(51) Int. Cl.
*H02J 7/00*    (2006.01)
(52) U.S. Cl. .................. 320/116; 320/160; 320/155
(58) Field of Classification Search ................ 320/107, 320/110, 116, 124, 130, 133, 132, 138, 160, 320/155
See application file for complete search history.

(56) References Cited

U.S. PATENT DOCUMENTS

| | | | | |
|---|---|---|---|---|
| 3,599,070 A | * | 8/1971 | Davis et al. ................ | 320/163 |
| 3,886,427 A | * | 5/1975 | Long ........................... | 320/156 |
| 4,609,861 A | * | 9/1986 | Inaniwa et al. ............. | 320/152 |
| 5,049,804 A | | 9/1991 | Hutchings | |
| 5,355,073 A | | 10/1994 | Nguyen ...................... | 320/116 |
| 5,387,857 A | * | 2/1995 | Honda et al. ............... | 320/120 |
| 5,619,116 A | * | 4/1997 | Takano et al. .............. | 320/116 |
| 5,675,816 A | * | 10/1997 | Hiyoshi et al. ............. | 713/324 |
| 5,677,615 A | * | 10/1997 | Takano et al. .............. | 320/152 |
| 5,734,252 A | | 3/1998 | Griffin et al. ............... | 320/124 |
| 5,973,480 A | * | 10/1999 | Takano et al. .............. | 320/152 |
| 6,118,676 A | * | 9/2000 | Divan et al. ................. | 363/34 |
| 6,124,700 A | * | 9/2000 | Nagai et al. ................ | 320/132 |
| 6,483,272 B1 | * | 11/2002 | Terada et al. ............... | 320/103 |
| 6,522,102 B1 | * | 2/2003 | Cheiky et al. .............. | 320/125 |
| 7,012,405 B2 | * | 3/2006 | Nishida et al. ............. | 320/137 |
| 2004/0080891 A1 | * | 4/2004 | Shyr et al. .................. | 361/93.1 |

FOREIGN PATENT DOCUMENTS

| | | |
|---|---|---|
| JP | 55119368 | 9/1980 |
| JP | 3293936 | 12/1991 |
| JP | 4109828 | 4/1992 |
| JP | 5207672 | 8/1993 |
| JP | 6014474 | 1/1994 |
| JP | 2003199259 | 7/2003 |

OTHER PUBLICATIONS

Office Action dated May 22, 2007 issued for Japanese Patent Application No. 2002-349243.

* cited by examiner

*Primary Examiner*—Gary L. Laxton
*Assistant Examiner*—Samuel Berhanu
(74) *Attorney, Agent, or Firm*—McGuireWoods LLP

(57) ABSTRACT

To provide a universal battery charger with low power consumption during a standby condition and a rush current suppressing capability at the time of commencement of charging, a voltage slightly larger than a battery voltage is produced and applied to the battery. Thereafter, the highest voltage is produced and applied to the battery to charge the same. When the battery is unloaded from the battery charger, the lowest voltage is produced to save power consumption.

15 Claims, 2 Drawing Sheets

UNIVERSAL BATTERY CHARGER

BACKGROUND OF THE INVENTION

1. Field of the Invention

This invention relates to a universal battery charger capable of charging batteries with different voltages.

2. Description of the Related Art

Among various types of battery chargers, universal battery chargers that can charge batteries consisting of different number of cells, i.e., batteries with different voltages, are becoming more common. A universal battery charger can charge, for example, 9.6V, 12V and 14V batteries consisting of 8, 10 and 12 cells connected in series respectively wherein each cell is 1.2V.

The voltage output from the universal battery charger is subject to constant voltage control and the battery charger is set to output a voltage required to charge the batteries consisting of the largest number of cells that the battery charger can handle. This creates a problem in charging batteries consisting of cells fewer in number than maximum. As a result, a large rush current flows in the battery when a switch circuit is closed. This may inflict significant damage on the switch circuit in the charging loop.

When the battery is unloaded from the battery charger or when charging the battery is halted upon detection of the fully charged condition, the switch circuit is turned off so as not to allow the charging current to flow in the battery charging loop. Because a power supply circuit of the battery charger is controlled to output a voltage corresponding to the battery with the largest number of cells, power consumption is larger than necessary.

SUMMARY OF THE INVENTION

An object of this invention is to solve the above-mentioned problems and to provide a universal battery charger that reduces power consumption and suppresses the rush current at the start of charging.

In order to achieve the above and other objects, there is provided a universal battery charger for charging batteries with different number of cells connected in series. The charger includes a power supply circuit, a switch connected between the power supply circuit and the battery, and a control device. The power supply circuit produces a predetermined number of voltages different in level for applying selected one of the predetermined number of voltages to the battery. The switch is turned ON to allow the selected one of the predetermined number of voltages to the battery and OFF to interrupt the power supply circuit from the battery. The control device controls the power supply circuit to produce a voltage to be applied to the battery and also controls the switch so that a rush current does not flow in the battery when the voltage to be applied to the battery is switched from one level to another level.

When the battery is unloaded from the battery charger, the control device controls the power supply circuit to produce a lowest voltage, thereby saving the power consumption.

DETAILED DESCRIPTION OF THE PREFERRED EMBODIMENTS

Figure 1:
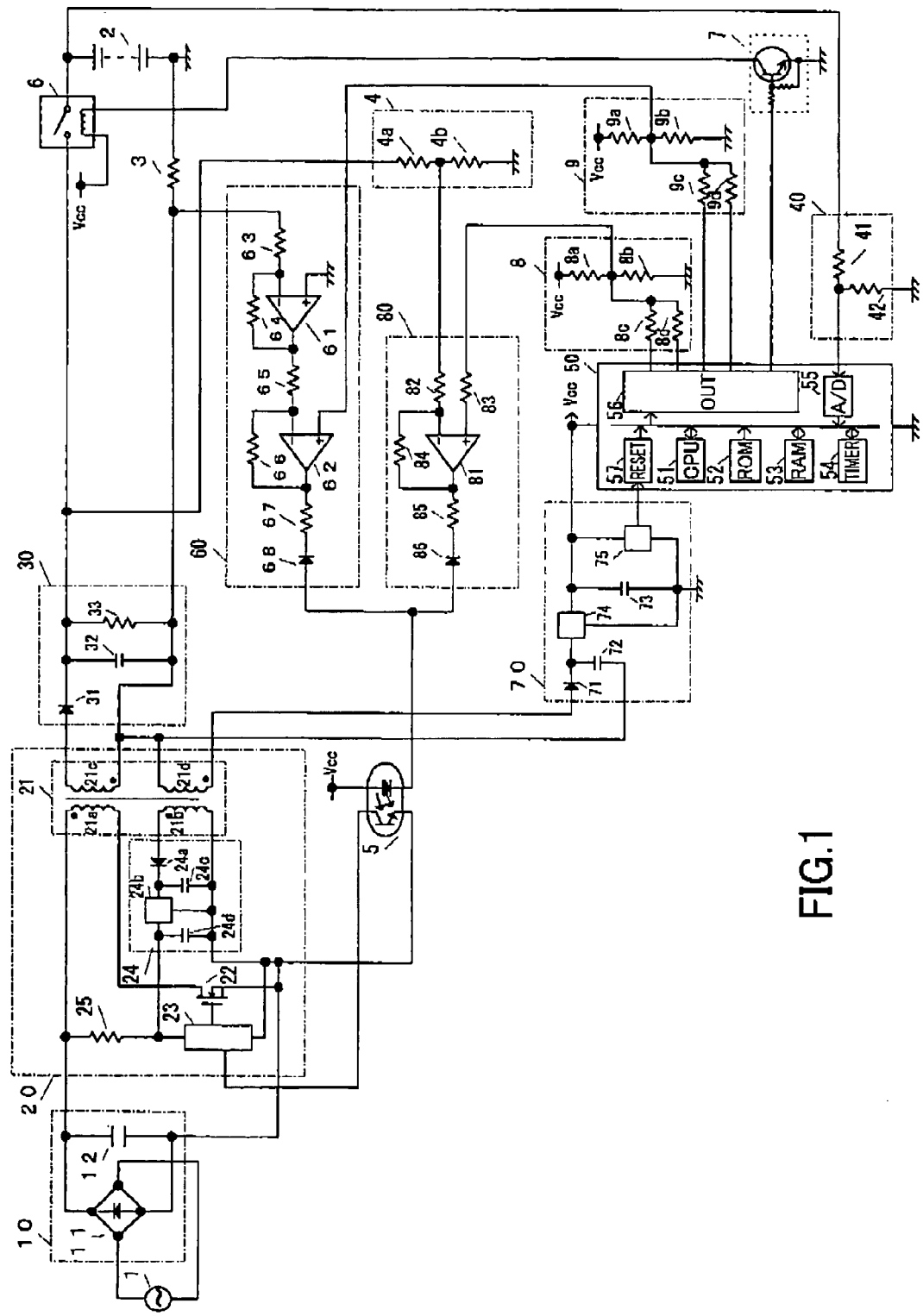
FIG. 1 is a circuit diagram showing the configuration of a universal battery charger according to an embodiment of the invention.

A universal battery charger according to preferred embodiments of the invention will be described with reference to the accompanying drawings. FIG. 1 is a schematic diagram showing a configuration of the universal battery charger. In use, the battery charger is connected to an AC power supply 1 and a battery 2 is loaded in the battery charger. The battery 2 consists of a plurality of cells connected in series.

The battery charger includes a switch circuit 6 and a switch drive circuit 7. The switch circuit 6 is interposed in a charging current path, i.e., between a rectifying/smoothing circuit 30 and the battery 2. The switch circuit 6 is configured by a relay that is rendered ON when the charging current is to be supplied to the battery 2 and OFF when the charging current is not to be supplied to the battery 2 in such cases where the battery 2 is unloaded from the battery charger or charging the battery 2 is halted upon detection of the fully charged condition of the battery 2. The switch drive circuit 7 is connected between the output port 56 of a microcomputer 50 (to be described in detail hereinafter) and the switch circuit 6. The switch drive circuit 7 includes a transistor that is rendered ON and OFF based on the output from the output port 56 of the microcomputer 50.

The battery charger further includes a resistor 3 and an output voltage detecting circuit 4. The resistor 3 serves as a current detector and is connected to the battery 2 for detecting a charging current flowing in the battery 2. A voltage corresponding to the detected charging current is applied to a charging current control circuit 60. The output voltage detecting circuit 4 includes resistors 4a and 4b. The output voltage detecting circuit 4 divides an output voltage from the rectifying/smoothing circuit 30 with the resistors 4a and 4b and outputs the resulting voltage to an output voltage control circuit 80.

An output voltage setting circuit 8 is connected between the microcomputer 50 and the output voltage control circuit 80. The output voltage setting circuit 8 includes resistors 8a, 8b, 8c and 8d that are connected in such a manner that the voltage developed across the resistor 8b can be selectively set to one of four levels depending on LOW or HIGH impedance level output on the ports led to the resistors 8c and 8d. The voltage output from the output voltage setting circuit 8 is applied as a reference voltage to the output voltage control circuit 80. The output voltage control circuit 80 compares the output voltage from the rectifying/smoothing circuit 30 with the reference voltage. With the four different level outputs from the output voltage setting circuit 8, four different level output voltages can be selectively output from the rectifying/smoothing circuit 30.

A charging current setting circuit 9 is connected between the microcomputer 50 and the charging current control circuit 60. The charging current setting circuit 9 includes resistors 9a, 9b, 9c and 9d that are connected in a similar fashion to the resistors 8a, 8b, 8c and 8d in the output voltage setting circuit 8. That is, the voltage developed across the resistor 9b can be selectively set to one of four levels depending on LOW or HIGH impedance level output on the ports led to the resistors 9c and 9d. The voltage output from the charging current setting circuit 9 is applied as a reference charging current to the charging current control circuit 60. The charging current control circuit 60 compares the output voltage indicative of the charging current currently flowing in the battery 2 with the output voltage from the charging current setting circuit 9 indicative of the reference charging currents. With the four different level outputs from the charging current setting circuit 9, four different level charging currents can be selectively flowed in the battery 2.

The battery charger also includes a photo-coupler 5 that feeds back the output voltage from the rectifying/smoothing circuit 30 and charging current signals to a PWM control IC 23.

The battery charger further includes a rectifying/smoothing circuit 10 and a switching circuit 20. The rectifying/smoothing circuit 10 is provided in the primary side of a high-frequency transformer 21 and includes a full-wave rectifier 11 and a smoothing capacitor 12. The switching circuit 20 includes the high-frequency transformer 21, a MOSFET 22, an SW controlling IC 23, a constant voltage circuit 24 for the SW controlling IC 23, and a starting resistor 25. The high-frequency transformer 21 includes a primary coil 21a, a secondary coil 21b, a ternary coil 21c, and a quaternary coil 21d. A DC input voltage is applied to the primary coil 21a. The secondary coil 21b is the output coil for the SW controlling IC 23. The ternary coil 21c is the output coil for charging the battery 2. The quaternary coil 21d is an output coil for a power source supplying power to the microcomputer 50, a charging current control circuit 60, and the like.

The secondary coil 21b and the quaternary coil 21d are configured with the same polarity as the primary coil 21a, while the ternary coil 21c has reverse polarity. The SW controlling IC 23 is a switching power supply IC that adjusts output voltage by changing the width of driving pulses applied to the MOSFET 22. The constant voltage circuit 24 includes a diode 24a, a 3-terminal regulator 24b, and capacitors 24c and 24d. The constant voltage circuit 24 converts the voltage outputted from the secondary coil 21b into a constant voltage.

The rectifying/smoothing circuit 30 is provided in the ternary coil 21c of the high-frequency transformer 21 and includes a diode 31, a smoothing capacitor 32, and a resistor 33. The battery charger further includes a battery voltage detecting circuit 40 that includes resistors 41 and 42 for dividing the voltage across the terminals of the battery 2. The divided voltage is inputted to the microcomputer 50 via the A/D converter 55. The microcomputer 50 includes a CPU 51, a ROM 52, a RAM 53, a timer 54, an A/D converter 55, the output port 56, and a reset input port 57.

The CPU 51 samples a signal inputted into the A/D converter 55 at prescribed intervals and compares the current battery voltage with the battery voltage detected at a timing several samplings before the current sampling. Based on these comparisons, the CPU 51 determines whether the battery 2 has reached a full charge. The RAM 53 stores the battery voltage for the most recent sampled battery voltage and a predetermined number of earlier sampled battery voltages.

The charging current control circuit 60 includes operational amplifiers 61 and 62, resistors 63-67, and a diode 68. The charging current detected by the charging current detecting resistor 3 is applied to the operational amplifier 61 by which the voltage corresponding this charging current is subject to inverting amplification. The operational amplifier 62 amplifies the difference between the output voltage of the operational amplifier 61 and the charging current setting reference voltage set by the charging current setting circuit 9 and feeds this difference back to the SW controlling IC 23 via the photo-coupler 5.

The SW controlling IC 23 switches the MOSFET 22 on and off in order to maintain the charging current at a constant current. Specifically, the pulse generated and applied to the high-frequency transformer 21 is varied between a narrow pulse width when the charging current is large and a wide pulse width when the charging current is small. This pulse is smoothed to a direct current by the rectifying/smoothing circuit 30 before being applied to the battery 2. Hence, the current detecting resistor 3, charging current control circuit 60, photo-coupler 5, switching circuit 20, and rectifying/smoothing circuit 30 function to maintain the charging current of the battery 2 at the current value set by the microcomputer 50.

The battery charger further includes a constant voltage circuit 70 having a diode 71, capacitors 72 and 73, a 3-terminal regulator 74, and a reset IC 75. The constant voltage circuit 70 outputs a voltage for powering the microcomputer 50, the charging current control circuit 60, and the like. The reset IC 75 outputs a reset signal to the reset input port 57 in order to reset the microcomputer 50 to an initialized state.

The battery charger also includes the output voltage control circuit 80 having an operational amplifier 81, resistors 82-85, and a diode 86. The operational amplifier 81 amplifies the difference between the voltage from the output voltage detecting circuit 4 and the voltage from the output voltage setting circuit 8 and feeds this difference back to the SW controlling IC 23 via the photo-coupler 5, whereby the output voltage of the secondary rectifying/smoothing circuit 30 is controlled.

Next, a method for controlling a universal battery charger will be described with reference to the schematic diagram in FIG. 1 and the flowcharts in FIGS. 2A and 2B. The flowcharts in FIGS. 2A and 2B show an output voltage control method implemented by a universal battery charger according to first and second embodiments of the invention, respectively.

Figure 2A:
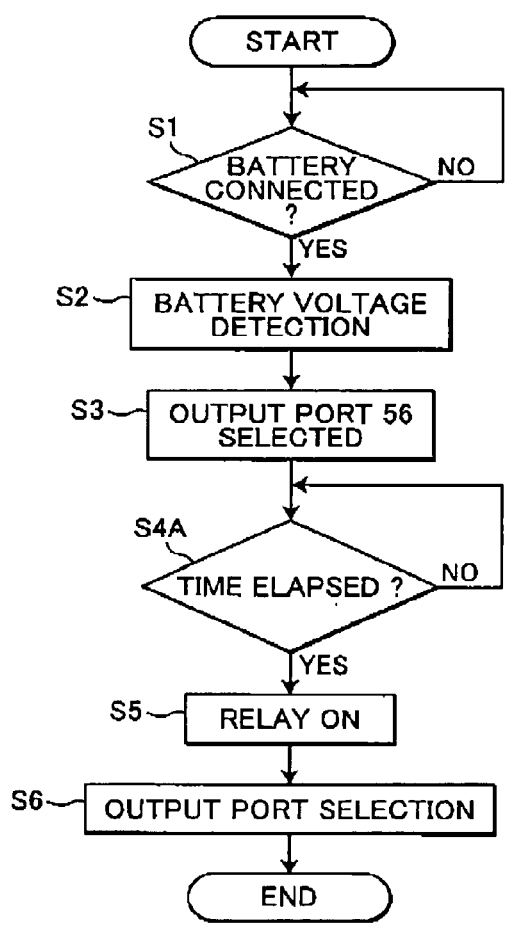
FIG. 2(a) is a flowchart illustrating the operation of the universal battery charger according to a first embodiment of the invention.
Figure 2B:
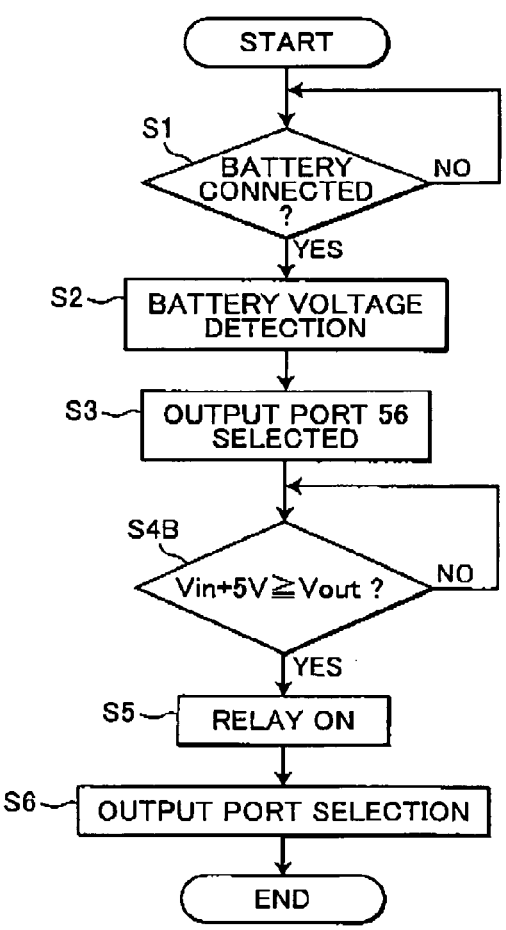
FIG. 2(b) is a flowchart illustrating the operation of the universal battery charger according to a second embodiment of the invention.

As shown in FIG. 2A, according to the first embodiment of the invention, the microcomputer 50 first checks whether the battery 2 is loaded in or connected to the battery charger (S1) based on the voltage applied to the microcomputer 50 from the battery voltage detecting circuit 40. The battery charger goes to a standby condition until battery 2 is connected.

As described previously, the output voltage setting circuit 8 outputs selective one of four different level voltages to the output voltage control circuit 80 depending on port outputs impressed on the resistors 8c and 8d. For the sake of brevity, the outputs applied to the resistors 8c and 8d from the output port 56 will hereinafter be referred to as "first port output" and "second port output", respectively. It is to be noted that each of the first and second port outputs is either LOW or HIGH level, so one of four different level voltages is developed across the resistor 8b depending on the first and second port outputs. As such, the rectifying/smoothing circuit 30 is capable of outputting selective one of four output voltages to the battery 2.

When the battery charger is placed in the standby condition with no battery connected (S1: No), both the first and second port outputs are, for example, set to LOW level so that the rectifying/smoothing circuit 30 outputs the lowest level voltage. This makes it possible to reduce standby power consumption.

When the battery 2 is connected to the battery charger (S1: YES), the microcomputer 50 detects the battery voltage based on the output from the battery voltage detection circuit 40 (S2) and determines the levels of the first and second port outputs based on the battery voltage thus detected (S3). For example, the microcomputer 50 determines the levels of the first and second port outputs to be LOW and HIGH respectively so that the output voltage from the rectifying/smoothing circuit 30 is the second lowest among the possible four voltages. The microcomputer 50 determines the levels of the first and second port outputs to be HIGH and LOW respectively so that the output voltage from the rectifying/smoothing circuit 30 is the third lowest voltage. The microcomputer 50 determines the levels of both the first and second port outputs to be HIGH so that the output voltage from the rectifying/smoothing circuit 30 is the highest among the possible four voltages. When the detected battery voltage is below a predetermined voltage, for example, 12 V or lower, the microcomputer 50 controls the first and second port outputs so that the rectifying/smoothing circuit 30 outputs the second lowest voltage, for example, 13 V. When the detected battery voltage is higher than the predetermined voltage, the microcomputer 50 controls the first and second port outputs so that the rectifying/smoothing circuit 30 outputs the second highest voltage.

Normally, both the first and second port outputs are set to LOW before the battery 2 is connected so that the rectifying/smoothing circuit 30 outputs the lowest voltage. When the battery 2 is connected and the connected battery is detected by a battery temperature sensor (not shown) as being at a high temperature higher than a predetermined value, then charging the battery 2 is not performed immediately but deferred until the battery temperature falls below the predetermined value. To this end, a cooling fan (not shown) is used to cool down the temperature of the battery 2. The output voltage from the rectifying/smoothing circuit 30 needs to be increased to power a cooling fan drive motor (not shown). At this time, both the first and second port outputs are set to HIGH so that the output from the rectifying/smoothing circuit 30 outputs the highest voltage, for example, 40 V. After the battery 2 is cooled down and placed in a state ready for charging, the following procedures are performed. When the detected battery voltage is 12 V as in the above-described example after the battery 2 is cooled down, the levels of the first and second port outputs are switched to HIGH and LOW respectively so that the output from the rectifying/smoothing circuit 30 drops to 13 V. When the output voltage from the rectifying/smoothing circuit 30 drops from 40 V to 13 V, electric charges stored in the capacitor 32 in the rectifying/smoothing circuit 30 are discharged via the resistor 33 with a predetermined time constant. Accordingly, the microcomputer 50 checks if a predetermined period of time has elapsed after switching the first and second port outputs (in the above example, only the second port output is switched from HIGH to LOW) to wait for the end of discharge (S4A).

When the predetermined period of time has elapsed (S4A: YES) and the output from the rectifying/smoothing circuit 30 has dropped to 13 V, the microcomputer 50 outputs a signal to the switch drive circuit 7 from the output port 56 to turn on the transistor in the circuit 7, thereby closing the relay contact in the switch circuit 6 (S5).

Then, both the first and second port outputs impressed respectively on the resistors 8a and Bb are switched to HIGH (S6) so that the output voltage from the rectifying/smoothing circuit 30 is increased to a chargeable voltage, for example, 40V from 13 V. Closure of the relay of the switch circuit 6 is slightly delayed from the application of the signal to the switch drive circuit 7. In order to eliminate the delay, the timing at which the signals are applied to the output voltage setting circuit 8 is delayed with respect to the timing at which the signal is applied to the switch drive circuit 7. This suppresses the rush current generated when the relay is closed and prevents damage to the relay of switch circuit 6.

The switch circuit 6 is turned off when, for example, the battery 2 is fully charged. In such a case, the microcomputer 50 switches the output voltage from the rectifying/smoothing circuit 30 from the highest level to the lowest level to place the battery charger in the standby condition. During the period of time when the output voltage from the rectifying/smoothing circuit 30 drops to the lowest level, the constant voltage circuit 70 is controlled so as not to be powered by the quaternary coil 21d. Capacitances of the capacitors 72 and 73 making up the constant voltage circuit 70 are selected to be capable of continuously supplying power to the microcomputer 50 during this period of time.

The flowchart in rig. 23 differs from that in FIG. 2A with respect only to the processes described in S4A and S4B. When the first and second port outputs are determined in S3, it is determined to see if the output voltage Vout from the rectifying/smoothing circuit 30 has dropped to a level close to the battery voltage (Vin). For example, when the difference between the output voltage Vout from the rectifying/smoothing circuit 30 and the battery voltage Vin is equal to or less than 5V (S4B: YES), the switch circuit 6 is turned on. It should be noted that in order to compare the voltage Vout with the battery voltage Vin, it is necessary that the voltage Vout be a digital value. To provide the voltage Vout in the form of a digital signal, the circuit diagram shown in FIG. 1 needs to be modified to add a structure for bringing the voltage Vout output from the rectifying/smoothing circuit 30 to the A/D converter 55 via a resistor circuit similar in configuration to the voltage detection circuit 40 including the resistors 41 and 42.

As described, the universal battery charger in accordance with the invention is capable ensuring low power consumption during standby condition and suppressing rush current to the battery at the start of charging.

What is claimed is:

1. A universal battery charger for charging batteries with different number of cells connected in series, comprising:
   a power supply circuit that produces a DC output voltage, the power supply circuit including a first switch circuit to control a level of the DC output voltage;
   a second switch that is connected between the power supply circuit and the battery and is turned ON to allow charging of the battery and OFF to interrupt the power supply circuit from the battery;
   an output voltage detecting circuit that detects a voltage level of the DC output voltage of the power supply circuit;
   a battery voltage detecting circuit that detects a voltage level across the battery;
   an output voltage setting circuit that produces a predetermined number of voltages different in level;
   a control unit that receives a detected signal from the battery voltage detecting circuit and sends a control signal to the output voltage setting circuit to select one of the predetermined number of voltages as a reference voltage; and an output voltage control circuit that compares the reference voltage with the voltage level detected by the output voltage detecting circuit to produce an output signal corresponding to a difference between the reference voltage and the detected voltage level, the output signal of the output voltage control circuit being applied to the first switch to control the level of the DC output voltage of the power supply circuit;

wherein the control unit includes means for controlling the second switch to turn ON and OFF, and means for producing the control signal applied to the output voltage setting circuit to select a voltage level which is close to the detected voltage level across the battery when the second switch is turned OFF and the control unit detects that the battery is connected to the battery charger.

2. The universal battery charger according to claim 1, wherein the output voltage control circuit controls the first switch to produce a voltage equal to or close to the reference voltage produced by the output voltage setting circuit.

3. The universal battery charger according to claim 2, wherein the control unit controls the second switch to turn on after expiration of a predetermined period of time from a time when the selected voltage level is applied to the output voltage control circuit.

4. The universal battery charger according to claim 1, wherein the control unit selects a voltage level which is higher than the voltage detected by the battery voltage detecting circuit among the predetermined number of voltages when the second switch is turned ON.

5. The universal battery charger according to claim 1, wherein the control unit selects a voltage level which is highest among the predetermined number of voltages after the second switch is turned on.

6. The universal battery charger according to claim 1, wherein the control unit checks whether the battery is connected to the battery charger from the voltage detected by the battery voltage detecting circuit.

7. The universal battery charger according to claim 1, wherein the control unit selects a voltage level which is lowest among the predetermined number of voltages when the second switch is turned OFF and the batter is not connected to the battery charger.

8. The universal battery charger according to claim 1, wherein the control unit controls the second switch to turn on when a difference between the voltage detected by the battery voltage detecting circuit and the voltage produced by the power supply circuit falls within a predetermined range.

9. The universal battery charger according to claim 8, wherein the control unit selects a voltage level which is the highest among the predetermined number of voltages after the second switch is turned on.

10. The universal battery charger according to claim 1, wherein the second switch is directly connected to the battery.

11. The universal battery charger according to claim 1, wherein the second switch is directly connected to the power supply circuit.

12. The universal battery charger according to claim 1, wherein the output voltage setting circuit produces more than two different predetermined number of voltages each different in level.

13. A method of charging a battery using a universal battery charger comprising:
    a power supply circuit that produces a DC output voltage which includes a first switch circuit to control a level of the DC output voltage
    a second switch that is connected between the power supply circuit and a battery and is turned ON to allow charging of the battery and OFF to interrupt the power supply circuit from the battery;
    an output voltage detecting circuit that detects a voltage level of the DC output voltage;
    a battery voltage detecting circuit that detects a voltage level across the battery;
    an output voltage setting circuit that produces a predetermined number of reference voltages different in level, the reference voltages including a first level, a second level lower than the first level and a third level lower than the second level;
    a control unit that receives a detected signal from the battery voltage detecting circuit and sends a control signal to the output voltage setting circuit to select one of the reference voltages; and
    an output voltage control circuit that compares the selected reference voltage with the voltage level detected by the output voltage detecting circuit to produce an output signal to control the level of the DC output voltage of the power supply circuit;

wherein the method comprises:
    first step of selecting a voltage having the third level produced by the output voltage setting circuit when the control unit detects that the second switch is rendered OFF;
    second step of detecting the voltage across the battery by the battery voltage detecting circuit;
    third step of selecting one of the first, second and third voltage levels which is higher than the detected battery voltage; and
    fourth step of applying the selected voltage level to the output voltage control circuit to control the level of the DC output voltage of the power supply circuit; and
    fifth step of controlling the second switch to turn ON.

14. The method of charging a battery according to claim 13, wherein the fifth step is performed when a predetermined period of time has elapsed after the fourth step.

15. The method of charging a battery according to claim 13, wherein the fifth step is performed when a difference between the voltage detected by the battery voltage detecting circuit and the voltage produced by the power supply circuit falls within a predetermined range.

* * * * *